US009455509B2

(12) United States Patent
Goerlitzer et al.

(10) Patent No.: US 9,455,509 B2
(45) Date of Patent: Sep. 27, 2016

(54) ELECTRICAL SERIES TERMINAL

(71) Applicant: PHOENIX CONTACT GMBH & CO. KG, Blomberg (DE)

(72) Inventors: Dirk Goerlitzer, Hessisch Oldendorf (DE); Juergen Brand, Detmold (DE); Heinz Reibke, Bad Salzuflen (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 3 days.

(21) Appl. No.: 14/400,353

(22) PCT Filed: May 3, 2013

(86) PCT No.: PCT/EP2013/001312
§ 371 (c)(1),
(2) Date: Nov. 11, 2014

(87) PCT Pub. No.: WO2013/167253
PCT Pub. Date: Nov. 14, 2013

(65) Prior Publication Data
US 2015/0147907 A1 May 28, 2015

(30) Foreign Application Priority Data
May 11, 2012 (DE) .......................... 10 2012 009 286

(51) Int. Cl.
H01R 13/66 (2006.01)
H01R 9/24 (2006.01)
H01R 9/26 (2006.01)

(52) U.S. Cl.
CPC ............ *H01R 9/2408* (2013.01); *H01R 9/265* (2013.01); *H01R 9/2608* (2013.01); *H01R 9/2625* (2013.01); *H01R 9/2675* (2013.01)

(58) Field of Classification Search
CPC H01R 9/2408; H01R 9/2608; H01R 9/2625; H01R 9/2675; H01R 9/265

USPC .......................... 439/709, 512, 532
See application file for complete search history.

(56) References Cited

U.S. PATENT DOCUMENTS

| 5,803,772 A | 9/1998 | Mueller et al. |
| 2005/0095904 A1 | 5/2005 | Reibke et al. |
| 2008/0248698 A1 | 10/2008 | Pizzi |
| 2008/0261426 A1 | 10/2008 | Diekmann et al. |
| 2011/0059658 A1 | 3/2011 | Eisert et al. |

FOREIGN PATENT DOCUMENTS

| CA | 2185765 A1 | 3/1997 |
| DE | 10011385 A1 | 9/2001 |
| DE | 102006008971 A1 | 9/2007 |
| DE | 202007005373 U1 | 8/2008 |
| DE | 102008014177 A1 | 9/2009 |
| DE | 202010015297 U1 | 2/2012 |
| EP | 1507315 A1 | 2/2005 |
| EP | 1953869 A2 | 8/2008 |
| JP | H09115576 A | 5/1997 |
| JP | 2011513940 A | 4/2011 |

*Primary Examiner* — Khiem Nguyen
(74) *Attorney, Agent, or Firm* — Leydig, Voit & Mayer, Ltd.

(57) ABSTRACT

An electrical series terminal includes a first connecting portion which is connected via a first associate current bar to a first functional contact and a second connection portion being connected via a second associate current bar to a second functional contact. A functional zone is provided between the first connection portion and the second connection portion. The functional zone is configured to selectively and alternately receive and contact a plurality of functional elements such that when at least one functional element is introduced to the functional zone, the at least one functional element can be connected to the first and second functional contact. On the sides of the functional zone, a first and second connecting shaft are provided on the first and second connection sections.

15 Claims, 3 Drawing Sheets

ELECTRICAL SERIES TERMINAL

CROSS REFERENCE TO RELATED APPLICATIONS

This application is a U.S. National Phase application under 35 U.S.C. §371 of International Application No. PCT/EP2013/001312, filed on May 3, 2013, and claims benefit to German Patent Application No. DE 10 2012 009 286.5, filed on May 11, 2012. The International Application was published in German on Nov. 14, 2013, as WO 2013 167253 A1 under PCT Article 21 (2).

FIELD

The present invention relates to an electrical series terminal, in particular for mechanical engineering and industrial usage, which can be used in a wide range of applications.

BACKGROUND

A wide variety of series terminals or series-capable connection terminals have become known in prior art. For example, in the field of power supply companies, series-capable test and disconnect terminals have become known, using which a full and reliable break in the circuits can be assured. Normally, rocker switches or lockable slide switches, which prevent an automatic restoration of a broken electrical circuit, are used to break circuits. Such test and disconnect terminals must reliably break the electrical circuit such that there is no danger to life or limb of the test technician during testing or maintenance. For this reason, there are specific regulations for test and disconnect terminals of this type used in the power supply sector.

Test disconnect terminals known from prior art normally have a longitudinal isolating switch, which is pivotally received in a self-retaining manner in both final positions. Using such a longitudinal isolating switch, longitudinal disconnection as well as transverse disconnection is assured, which is required for applications in the power supply sector. Moreover, in order to increase their functional diversity, known test disconnect terminals have three connecting shafts on each side of the longitudinal isolating switch, into which cross bridges or similar can be inserted, in order to short-circuit adjacent connecting shafts or to set them to the same potential.

Although test disconnect terminals of this type have proven to be effective in prior art, they do give rise to relatively high costs and in particular require a large installation space, which is not always available in mechanical engineering and industrial usage.

SUMMARY

In an embodiment, the present invention provides an electrical series terminal including a first connecting portion which is connected via a first associate current bar to a first functional contact and a second connection portion being connected via a second associate current bar to a second functional contact. A functional zone is provided between the first connection portion and the second connection portion. The functional zone is configured to selectively and alternately receive and contact a plurality of functional elements such that when at least one of the functional elements is introduced to the functional zone, least one functional element can be connected to the first and second functional contact. At sides of the functional zone, a first and second connecting shaft are provided on the first and second connection sections, respectively.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
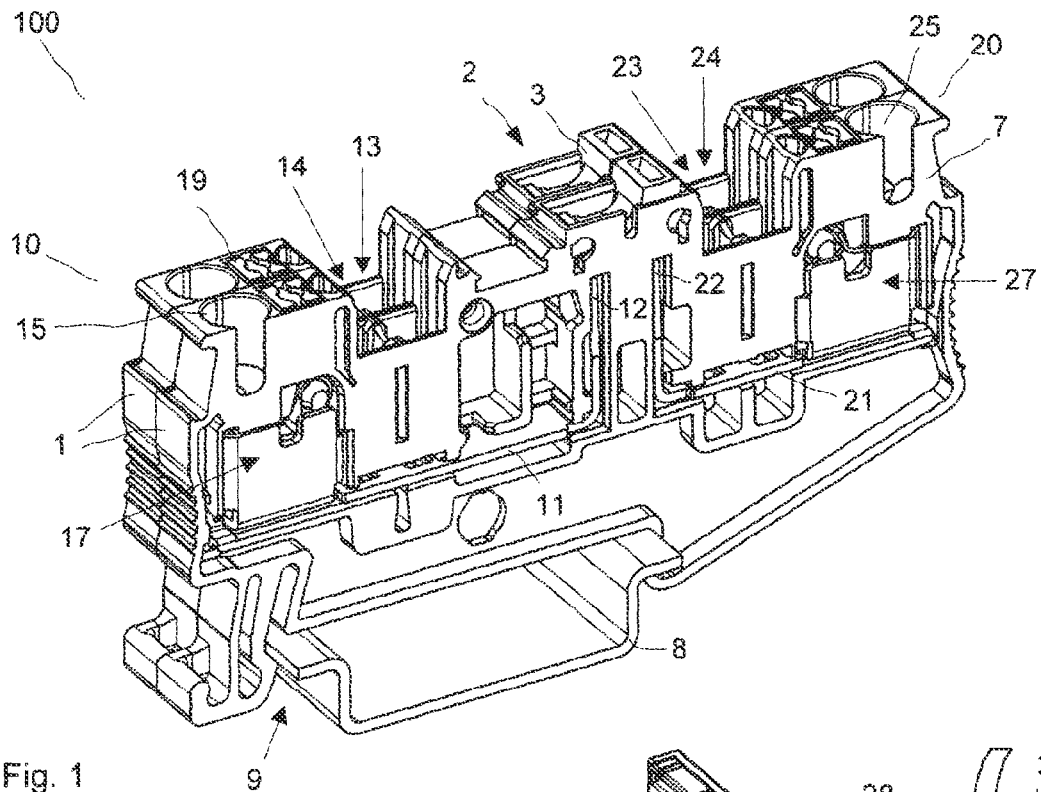
FIG. 1 is a perspective view of two series terminals according to the invention.

In an embodiment, the present invention provides an electrical series terminal and a corresponding electrical series terminal block, with which a greater functional diversity is achieved at lower cost and requiring less installation space.

An electrical series terminal according to an embodiment of the invention is particularly suitable for and provided for use in mechanical engineering and in industry and comprises a first connecting portion and a second connecting portion and a functional zone between the first connecting portion and the second connecting portion. The first connecting portion is connected via an associated current bar to a first functional contact. The second connecting portion is connected via an associated current bar to a second functional contact. In the process, the functional zone is suitable for and designed for selectively and in particular alternately receiving and contacting various functional elements such that when a functional element is introduced into the functional zone it can be connected to the first and/or second functional contact. Furthermore, on the sides of the functional zone two connecting shafts are provided on the first and second connecting portions respectively.

The series terminal according to an embodiment the invention has many advantages. The electrical series terminal or electrical series-capable terminal according to an embodiment of the invention can be achieved with a compact design and is therefore suitable for diverse uses in mechanical engineering and industry. Due to the two connecting shafts on each of the first connecting portion and the second connecting portions respectively, diverse operations can be performed simultaneously. Connecting elements and test connectors can be introduced simultaneously. In particular, it is also possible to insert a cross bridge into a connecting portion on each side of the functional zone, while at the same time a test connector is introduced, for example.

Because the functional zone is suitable for and designed for selectively and alternately receiving and contacting various functional elements, an even more diverse use of the series terminal according to an embodiment of the invention is possible. At the same time, the functional zones can be designed so as to be very small in structure which again reduces the overall size of the electrical series terminal according to an embodiment of the invention.

In particular, the electrical series terminal can have a complete housing of its own. It is also possible for the electrical series terminal to only have a partial housing, which is closed by an adjacent series terminal, as is customary in the case of many series connectors. Such a series terminal block of a plurality of electrical series connectors is then closed collectively by a suitable cover.

Preferably, the functional elements can be received at the functional zone by at least one longitudinal movement. In particular, the functional elements can be introduced into the functional zone by a longitudinal movement, which is orientated transverse and for example perpendicular to a connecting axis of the first and second connecting portions, such that the functional element contacts the first and/or the second functional contact.

For example, the electrically conductive contact between the first functional contact and the second functional contact can selectively be broken or restored by a longitudinal movement of the functional element.

In many applications in mechanical engineering and in industry, a separation of the first functional contact from the second functional contact is sufficient without guaranteeing the prevention of a restoration of the contact. In such applications, a functional element configured as a disconnect element can be produced such that it is compact and low cost and easy to receive at the functional zone.

Preferably, the first and/or the second connecting portions each have at least one conductor connection. It is also particularly preferable for it to be possible for the first and/or the second connecting portion to each have at least a second conductor connection. A conductor or a plurality of conductors can thus be connected to the series terminal on one side or on both sides respectively.

In all configurations, it is preferable for at least one conductor connection to be taken from a group of conductor connections which comprises spring clamps and in particular leg spring clamps and spring-cage terminal blocks as well as screw terminals and the like. Spring clamps are advantageous since they normally facilitate simple assembly.

Preferably, the functional zone is suitable for and designed for receiving a functional element. In the process, the functional element can be taken from a group of functional elements which comprises contact blades, isolating blades, fuse elements, blocking elements such as blocking diodes and also test elements and the like.

A functional element provided with a contact blade or isolating blade or a functional element configured as a contact blade or isolating blade facilitates the generation and release of a contact in a simple manner by a sliding or longitudinal movement, for example.

If applicable, the functional element can be replaced by another functional element, which additionally has or offers fuse functions, blocking functions or test functions. By using functional elements of this type, a particularly flexible use of the series terminal according to an embodiment of the invention can be facilitated.

In advantageous developments, the functional element has at least one light element or at least one fuse and/or at least one other electronic or electrical component. For example, it is possible for the functional element to emit acoustic or optical warning signals if permissible operating conditions or defined operating conditions are reached or exceeded.

In all configurations, at least one connecting shaft is designed to receive at least one cross bridge and/or a test connector and/or a pick-off terminal. Connecting shafts designed in such a way have many advantages since they allow the insertion of a wide variety of elements.

Since two connecting shafts are provided on each connecting portion respectively, two identical or different connecting elements can be inserted. For example, a cross bridge can be inserted into one connecting shaft while a test connector or pick-off terminal is introduced into the adjacent connecting shaft.

A cross bridge does not have to connect a series terminal to the directly adjacent series terminal, but rather can extend over a plurality of series terminals within a terminal block and connect two connecting shafts of series terminals which are further away from one another. Each connecting shaft can in particular be connected to the associated current bar so as to be electrically conductive.

In advantageous configurations, the series terminal has an at least partially insulating housing. This facilitates safe contact with the series terminal even when it is assembled.

At least one mounting rail receptacle is preferably provided on the series terminal for advantageous mounting in order to lock the series terminal to a mounting rail, for example a top hat rail or similar.

The invention is also aimed at a series terminal block, which is likewise suitable for and provided for mechanical engineering or industrial usage. The series terminal block comprises at least two adjacent series terminals, which can in particular be received on a mounting rail. In particular, at least one series terminal is constructed as described above.

At least one series terminal of the series terminal block has a first connecting portion and a second connecting portion and a functional zone between the first connecting portion and the second connecting portion. The first connecting portion is connected via an associated current bar to a first functional contact and the second connecting portion is connected via an associated current bar to a second functional contact. In the process, the functional zone is suitable for and designed for selectively and, if applicable, alternately receiving and contacting various functional elements such that when a functional element is introduced into the functional zone, the functional element can be connected to the first and/or the second functional contact. On the sides of the functional zone, two connecting shafts are provided each on the first connecting section and on the second connecting section respectively.

The series terminal block according to an embodiment of the invention also has many advantages since it facilitates many functions with a small structural volume and low costs.

It is possible for the series terminal bock to have at least one cross bridge for the electrical connection of the connecting shafts of two directly or indirectly adjacent series terminals. Furthermore, it is possible for a test connector to be arranged simultaneously in another connecting shaft of the same connecting portion.

Using the series-capable terminal according to an embodiment of the invention, a compact terminal can be provided, which nevertheless offers diverse functional options. Various different functional elements, which are adapted for the application, can be inserted into the central functional zone. At the same time, two connecting elements, with which an extension of the operational possibilities and further control of the function can be facilitated, can be connected to the connecting shafts on either side of the functional zone respectively.

In the process, the series terminal according to an embodiment of the invention facilitates a compact structural size, which is required in many applications, while at the same time safeguarding safety requirements that are adequate in mechanical engineering.

Further advantages and possible applications as well as properties of the present invention will emerge from the description of the embodiments, which are described hereinafter with reference to the accompanying drawings, in which FIG. 1 is a perspective view of a series terminal block 100 made up from two series terminals 1 according to an embodiment of the invention. The two series terminals 1 each have a mounting rail receptacle 9, with which they are clipped onto a mounting rail 8.

Each series terminal 1 has a functional zone 2, which is provided between a first connecting portion 10 and a second connecting portion 20. On the first connecting portion 10 each series terminal has a conductor connection 15 while the second connecting portion 20 has a conductor connection 25.

Furthermore, on each connecting portion 10, 20 two connecting shafts 13, 14 and 23, 24 respectively are arranged, which serve to receive cross bridges 27, for example. In addition, a receptacle for an indicator plate 30 can be provided.

Each connecting portion 10, 20 has a current bar 11, 21 assigned to it, which ends at adjacent connecting contacts 12, 22 on the functional zone 2. An electrically conductive connection is also created between the conductor connections 15 and 25 by the functional element 3, which connects the two functional contacts 12 and 22 so as to be electrically conductive.

A spring terminal 17, 27 is provided here on each conductor connection 15, 25 in order to clamp an introduced conductor such that it is electrically conductive. In order to be able to remove an introduced conductor again, break contacts 19 are provided here in the form of triggers, which press against a leg of the leg spring 18 (cf. FIG. 4) and thus reverse the clamping of an introduced conductor.

Figure 2:
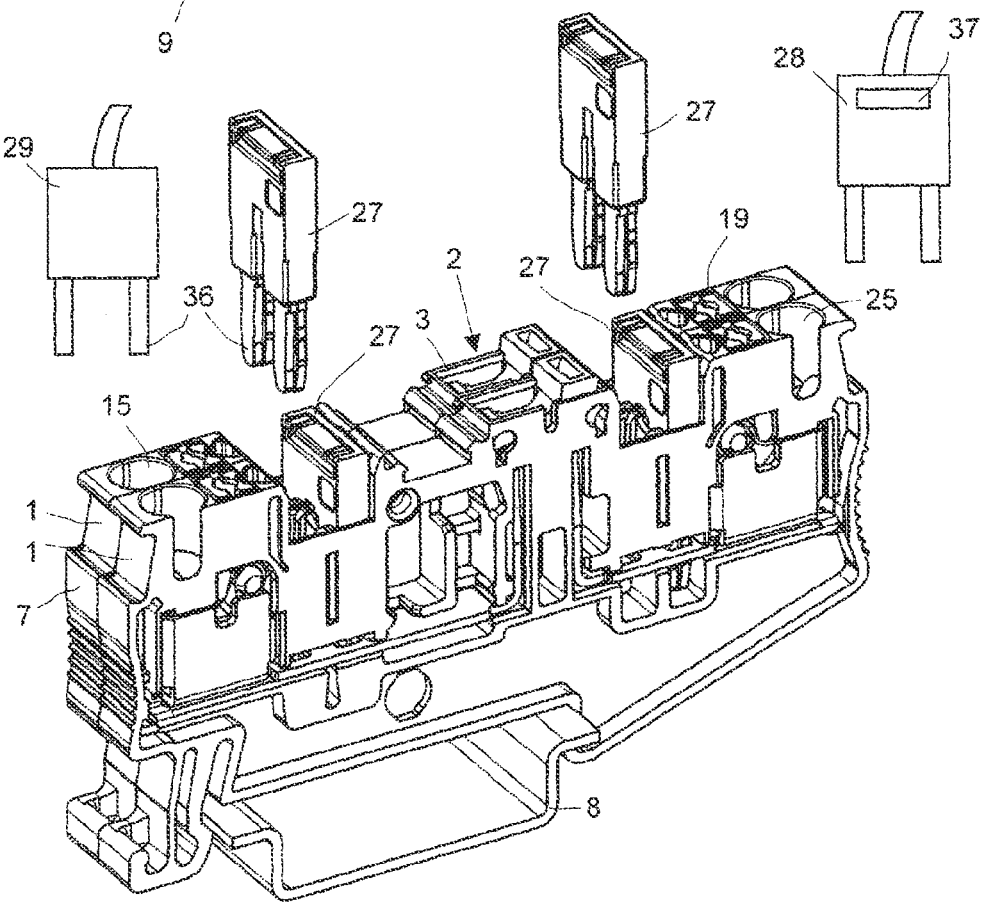
FIG. 2 shows the series terminals from FIG. 1, where two cross bridges have been inserted in each case.

FIG. 2 is a perspective view of the series terminal block 100 from FIG. 1, cross bridges 27 having been inserted into the connecting shaft 13 and into the connecting shaft 24.

Above the series terminals, two further cross bridges 27 have been drawn in such that their contact pins 36 are visible, which in their assembled state engage in contact holes 35 (cf. FIG. 5) of the associated current bars 11 and 21 so as to form a contact.

As an alternative to the introduction of cross bridges 27, it is also possible to insert a test connector 28 or a pick-off terminal 29, which are shown schematically, which have corresponding cable channels. A display device 37 is shown schematically on the test connector 28 and can serve to display optical messages and information about the operating state, for example.

Figure 3:
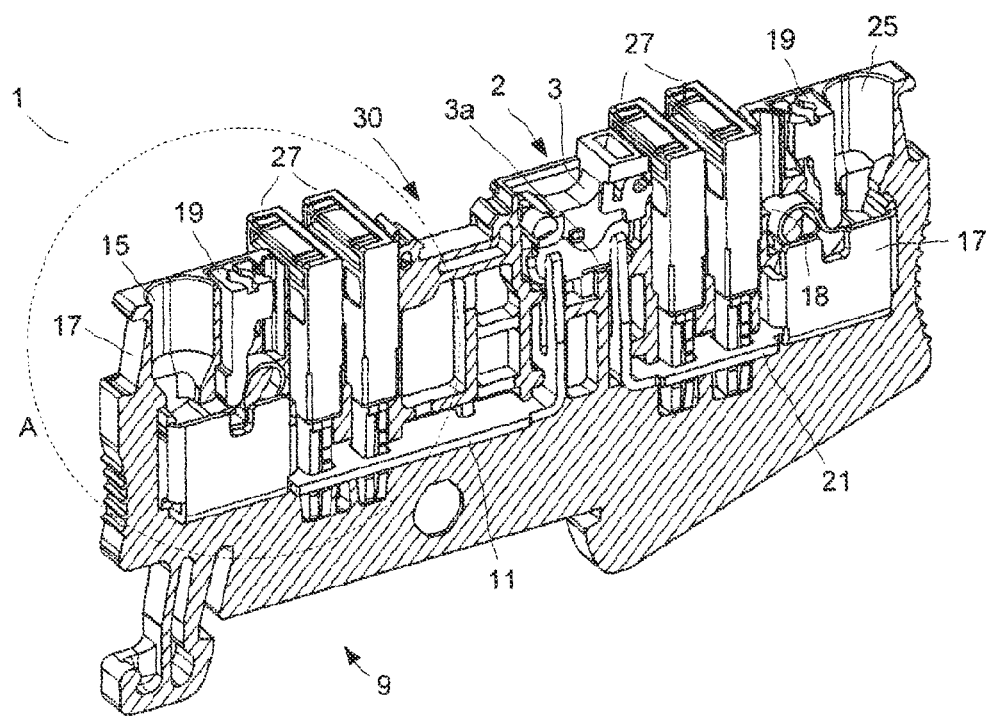
FIG. 3 is a cross section through a series terminal according to FIG. 2 with two inserted cross bridges.

FIG. 3 shows a cross section of a series terminal 100, where a cross bridge 27 has been introduced into every respective connecting shaft 13, 14, 23, 24. It can be seen clearly that the contact pins 36 of the cross bridges 27 contact the contact holes 35 of the current bars 11, 21 so as to be electrically conductive.

A functional element 3 with an isolating blade 3a has been introduced into the functional zone 2. The isolating blade 3a has been inserted between the forked ends of the functional contacts 12 and 22 and connects the functional contacts 12 and 22 to one another so as to be electrically conductive.

Figure 4:
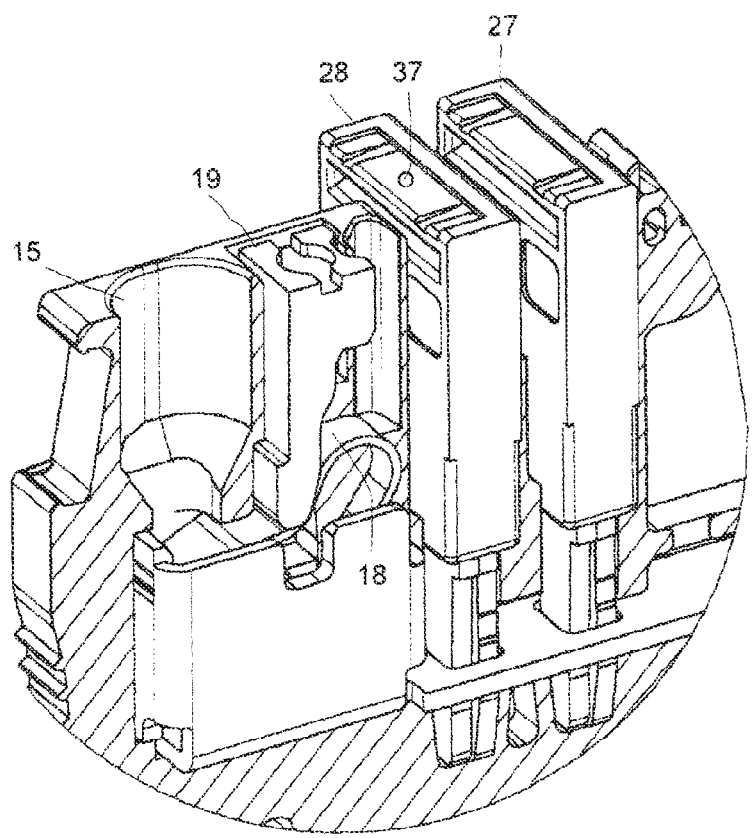
FIG. 4 shows an enlarged detail "A" from FIG. 3.

FIG. 4 shows the detail "A" from FIG. 3 in an enlarged scale. A conductor that is to be contacted can be inserted into the conductor connection 15 and is retained by clamping in the clamping zone by the clamping spring, which is configured here as a leg spring 18. By actuating the trigger 19, the clamping effect of the clamping spring 18 can be reversed and an inserted conductor removed from the conductor connection 15 again.

While a cross bridge 27 has been inserted here into the connecting shaft 13, the connecting shaft 14 receives a test connector or a test socket 28, on which a display device 37 has been provided, here in the form of a light diode, for example, in order to display the operating state or to indicate malfunctions.

Figure 5:
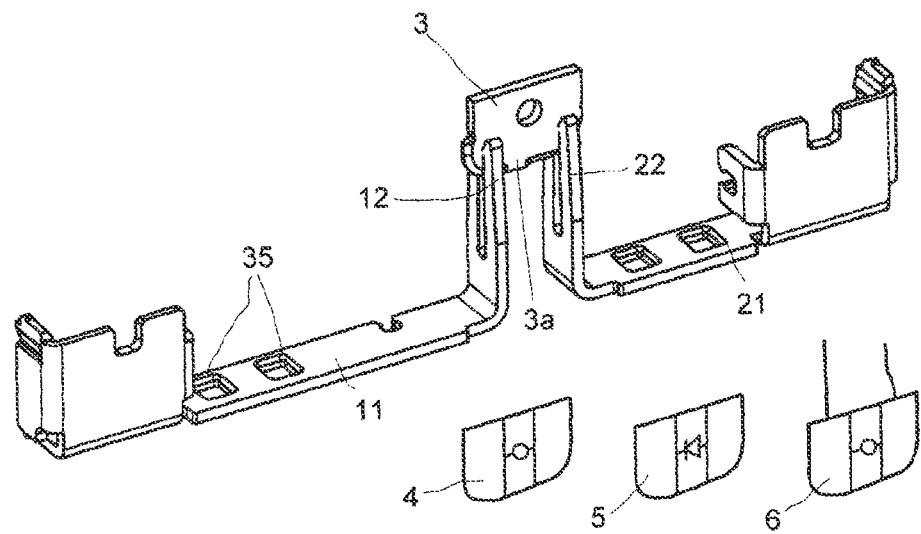
FIG. 5 shows the current bar of the series terminal from FIG. 3 connected via a contact blade.

FIG. 5 shows the current bars 11 and 21 of the first connecting portion 10 and of the second connecting portion 20 with the functional zone 2 provided in between. A contact blade 3a connects the forked functional contacts 12 and 22 to one another so as to be electrically conductive.

Also drawn in are another three functional elements 4, 5 and 6, which can be exchanged for the functional element 3 with the contact blade 3a. The functional element 4 here is configured as a fuse element and has, for example, a fuse, which breaks an electrical connection between the functional contacts 12 and 22 when permissible conditions are departed from or exceeded.

The functional element 5 serves as a blocking element and only transfers a current in one direction, for example.

The functional element 6 can in turn contain a fuse, for example, and/or additionally or instead of this serve as a test element and be provided with appropriate cables.

In FIG. 5, the contact holes 35 are visible, which are provided underneath the connecting shafts 13, 14 and 23, 24. A contact pin 36 engages resiliently in these contact holes 35 when inserting a cross bridge 27, for example, such that an electrical contacting of the current bar 11 or 21 is assured.

Figure 6:
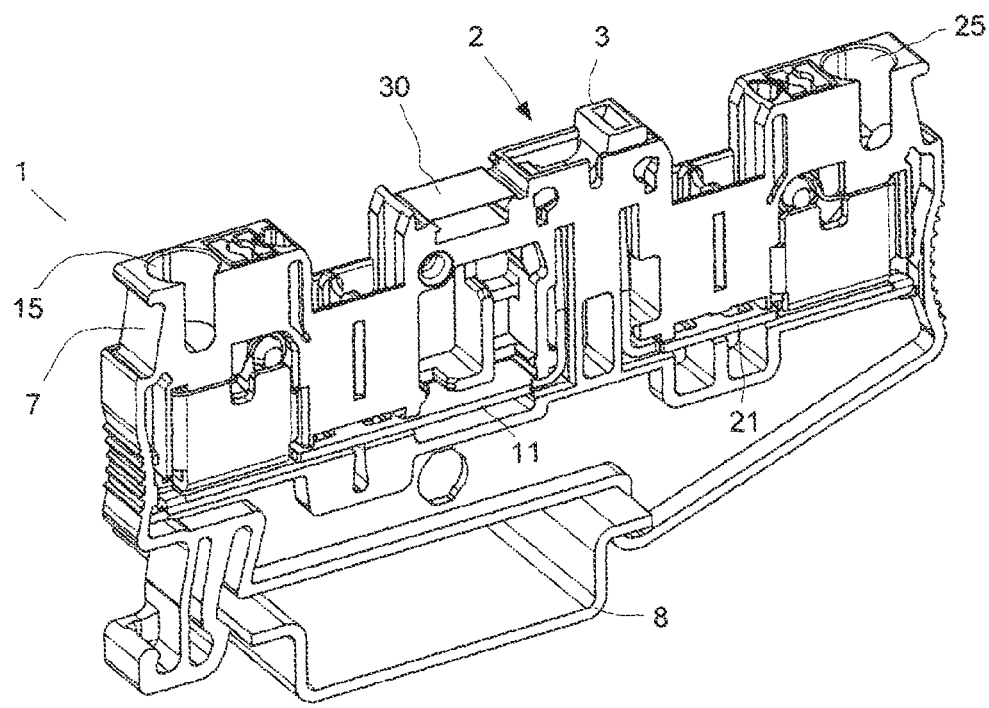
FIG. 6 shows a series terminal according to the invention configured as a single terminal.

FIG. 6 shows a series terminal 1 where an indicator plate 30 is provided on the indicator plate receptacle. The series terminal in turn has conductor connections 15 and 25. On each central functional zone 2 a functional element 3 is received, which selectively connects the functional contacts 11 and 12 to one another or disconnects them from one another.

The series terminal 1 from FIG. 6 can have a complete housing 7 of its own or the housing 7 of the series terminal 1 is closed by an additional cover.

Altogether the invention provides an advantageous electrical series terminal for industrial applications and for use in mechanical engineering, which is low cost and compact since the functional zone 2, for example, has a compact design with exchangeable functional elements.

Because only two connecting shafts are provided on each side of the functional zone, installation space can be saved and furthermore a high level of functionality can be facilitated at low cost.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B", unless it is clear from the context or the foregoing description that only one of A and B is intended. Further the recitation of A, B and C should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS electrical series connector 1
functional zone 2
functional element 3-6
isolating blade 3*a*
housing 7
mounting rail 8
mounting rail receptacle 9
connecting portion 10
current bar 11
functional contact 12
connecting shaft 13, 14
cable connection 15
clamping spring 17
leg spring 18
break contact, trigger 19
connecting portion 20
current bar 21
functional contact 22
connecting shaft 23, 24
cable connection 25
cross bridge 27
test terminal 28
pick-off terminal 29
indicator plate 30
light element 32
fuse 33
component 34
contact hole 35
contact pin 36
display device 37
series terminal block 100

The invention claimed is:

1. An electrical series terminal comprising:
 a first connecting portion, the first connecting portion being connected via a first associated current bar to a first functional contact;
 a second connecting portion, the second connecting portion being connected via a second associated current bar to a second functional contact; and
 a functional zone provided between the first connecting portion and the second connecting portion,
 wherein the functional zone is configured to selectively and alternately receive and contact a plurality of functional elements such that when at least one of the functional elements is introduced into the functional zone, the at least one functional element can be connected to the first and second functional contact, and wherein at sides of the functional zone a first and second electrical connecting shaft are provided on the first and second connecting portions, respectively.

2. The electrical series terminal recited in claim 1, wherein the plurality of functional elements can be received at the functional zone by a longitudinal movement.

3. The electrical series terminal recited in claim 1, wherein at least one of the first and second connecting portions has at least a first conductor connection.

4. The electrical series terminal recited in claim 3, wherein at least one of the first and second connecting portions has at least a second conductor connection.

5. The electrical series terminal recited in claim 3, wherein the first conductor connection includes at least one of a spring clamp or a screw terminal.

6. The electrical series terminal recited in claim 1, wherein the plurality of functional elements includes at least one of a contact blade, a fuse element blocking element, or a test element.

7. The electrical series terminal recited in claim 1, wherein the at least one functional element includes at least one of a light element or a fuse.

8. The electrical series terminal recited in claim 1, wherein at least one electrical connecting shaft is designed to receive at least one of a cross bridge, a test connector, or a pick-off terminal.

9. The electrical series terminal recited in claim 1, further comprising an at least partially insulated housing.

10. The electrical series terminal recited in claim 1, further comprising a mounting rail receptacle.

11. An electrical series terminal block comprising at least two series terminals which are adjacent to one another and are configured to be received on a mounting rail, each of the series terminals comprising:
 a first connecting portion, the first connecting portion being connected via a first associated current bar to a first functional contact;
 a second connecting portion, the second connecting portion being connected via a second associated current bar to a second functional contact; and
 a functional zone provided between the first connecting portion and the second connecting portion,
 wherein the functional zone is configured to selectively and alternately receive and contact a plurality of functional elements such that when at least one of the functional elements is introduced into the functional zone, the at least one functional element can be connected to the first and second functional contact, and wherein at sides of the functional zone a first and second electrical connecting shaft are provided on the first and second connecting portions, respectively.

12. The electrical series terminal block recited in claim 11, wherein at least one cross bridge is provided for electrically connecting the electrical connecting shafts of adjacent series terminals.

13. The electrical series terminal recited in claim 5, wherein the spring clamp is a leg spring clamp or a spring cage terminal.

14. The electrical series terminal block recited in claim 11, wherein at least one test connector is arranged in another electrical connecting shaft of the same connecting portion.

15. The electrical series terminal block recited in claim 12, wherein at least one test connector is arranged in another electrical connecting shaft of the same connecting portion.

\* \* \* \* \*